United States Patent
Ai et al.

(10) Patent No.: US 12,246,386 B2
(45) Date of Patent: Mar. 11, 2025

(54) CONTROL DEVICE AND RECORDING MEDIUM ENCODED WITH PROGRAM

(71) Applicant: FANUC CORPORATION, Yamanashi (JP)

(72) Inventors: Minjie Ai, Yamanashi (JP); Tomoyuki Furuta, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 677 days.

(21) Appl. No.: 17/089,056

(22) Filed: Nov. 4, 2020

(65) Prior Publication Data

US 2021/0178500 A1 Jun. 17, 2021

(30) Foreign Application Priority Data

Dec. 13, 2019 (JP) .................. 2019-225253

(51) Int. Cl.
*B23H 1/02* (2006.01)
*B23H 1/04* (2006.01)

(52) U.S. Cl.
CPC ............. *B23H 1/022* (2013.01); *B23H 1/028* (2013.01); *B23H 1/04* (2013.01)

(58) Field of Classification Search
CPC .......... B23H 1/022; B23H 1/028; B23H 1/04; B23H 2500/20; B23H 7/26; B23H 7/265; B23H 7/30; B23H 7/32; B23H 7/065; B23H 7/04; B23H 1/00–024; B23H 7/20; G05B 2219/45043
USPC ...................... 219/69.16, 69.18, 69.12–69.13
See application file for complete search history.

(56) References Cited

U.S. PATENT DOCUMENTS

2002/0060528 A1* 5/2002 Murai ................. B23H 7/04
315/291

FOREIGN PATENT DOCUMENTS

| JP | H03-281150 A | 12/1991 |
|---|---|---|
| JP | 2002-154015 A | 5/2002 |
| JP | 2004314191 | * 11/2004 |
| JP | 2005-118971 A | 5/2005 |
| JP | 2013-226612 A | 11/2013 |

OTHER PUBLICATIONS

English translation to JP2004314191 (Year: 2004).*

* cited by examiner

*Primary Examiner* — Sang Y Paik
*Assistant Examiner* — Bonita Khlok
(74) *Attorney, Agent, or Firm* — Studebaker Brackett PLLC

(57) ABSTRACT

A contact detection unit, after executing a first detection operation of contact between the wire electrode and the workpiece at a first relative movement speed and a first pulse cycle, executes a second detection operation of contact between the wire electrode and the workpiece, at a second relative movement speed which is slower than the first relative movement speed, and at a second pulse cycle which is longer than the first pulse cycle, and a movement speed control unit, after execution of the first detection operation, and prior to execution of the second detection operation, causes the wire electrode and the workpiece to relatively move in a distancing direction.

5 Claims, 2 Drawing Sheets

CONTROL DEVICE AND RECORDING MEDIUM ENCODED WITH PROGRAM

This application is based on and claims the benefit of priority from Japanese Patent Application 2019-225253, filed on 13 Dec. 2019, the content of which is incorporated herein by reference.

BACKGROUND OF THE INVENTION

Field of the Invention

The present invention relates to a control device and a recording medium encoded with a program.

Related Art

Conventionally, a wire electrical discharge machine has been known which machines a workpiece by generating an electrical discharge at the electrode gap between a wire electrode and a workpiece. With the wire electrical discharge machine, the relative position of the wire electrode and workpiece is changed by operation of a servomotor, at the same time as the generation of electrical discharge. The wire electrical discharge machine can thereby machine the workpiece into a desired shape.

Upon machining of a workpiece, positioning of the wire electrode and workpiece is conducted. As a device which conducts such positioning of the wire electrode and workpiece, a contact detection apparatus for the wire electrical discharge machine has been proposed which conducts positioning by detecting contact between the wire electrode and workpiece, for example (refer to Patent Document 1).

Patent Document 1: Japanese Unexamined Patent Application, Publication. No. 2013-226612

SUMMARY OF THE INVENTION

In Patent Document 1, a detection voltage is applied to the electrode gap of the wire electrode and workpiece. In addition, in Patent Document 1, contact is decided based on a change in detection voltage due to contact between the wire electrode and workpiece. The relative position (end surface of workpiece) between the wire electrode and workpiece is thereby detected. Then, with Patent Document 1, the machining of the workpiece is started with the detected position as a reference position.

However, since the wire electrode slightly oscillates, the electrical discharge occurs in response to the oscillation at the electrode gap when the wire electrode approaches the workpiece. The ware electrode receives the repulsive force from the electrical discharge and comes to oscillate more greatly. By the oscillations becoming greater, the number of times of electrical discharge occurring at the electrode gap between the wire electrode and workpiece increases. As a result thereof, since the craters in the workpiece surface increase, the detection precision has deteriorated. Therefore, it is ideal if able to improve the contact detection precision between the wire electrode and workpiece, since the precision of the relative position between the wire electrode and workpiece can be improved.

A first aspect of the present disclosure relates to a control device which controls a wire electrical discharge machine having a movement drive unit causing a wire electrode and a workpiece to relatively move, the control device measuring a relative position of the wire electrode and the workpiece by detecting contact between the wire electrode and the workpiece which had been made to relatively move, the control device including: a cycle setting unit which sets a pulse cycle of a detection voltage applied to an electrode gap between the wire electrode and the workpiece; a voltage application unit which applies the detection voltage to the electrode gap at a set cycle; a movement speed control unit which controls relative movement speed by way of the movement drive unit; and a contact detection unit which detects contact between the wire electrode and the workpiece, based on a change in the detection voltage applied; in which the contact detection unit, after executing a first detection operation of contact between the wire electrode and the workpiece at a first relative movement speed and a first pulse cycle, executes a second detection operation of contact between the wire electrode and the workpiece, at a second relative movement speed which is slower than the first relative movement speed, and at a second pulse cycle which is longer than the first pulse cycle, and the movement speed control unit, after execution of the first detection operation, and prior to execution of the second detection operation, causes the wire electrode and the workpiece to relatively move in a distancing direction.

In addition, a second aspect of the present disclosure relates to a recording medium encoded with a program which causes a computer to function as control device which controls a wire electrical discharge machine having a movement drive unit causing a wire electrode and a workpiece to relatively move, the control device measuring a relative position of the wire electrode and the workpiece by detecting contact between the wire electrode and the workpiece which had been made to relatively move, the program causing the computer to function as: a cycle setting unit which sets a pulse cycle of a detection voltage applied to an electrode gap between the wire electrode and the workpiece; a voltage application unit which applies the detection voltage to the electrode gap at a set cycle; a movement speed control unit which controls relative movement speed by way of the movement drive unit; and a contact detection unit which detects contact between the wire electrode and the workpiece, based on a change in the detection voltage applied; in which the contact detection unit, after executing a first detection operation of contact between the wire electrode and the workpiece at a first relative movement speed and a first pulse cycle, executes a second detection operation of contact between the wire electrode and the workpiece, at a second relative movement speed which is slower than the first relative movement speed, and at a second pulse cycle which is longer than the first pulse cycle, and the movement speed control unit, after execution of the first detection operation, and prior to execution of the second detection operation, causes the wire electrode and the workpiece to relatively move in a distancing direction.

According to the present disclosure, it is possible to provide a control device and a recording medium encoded with a program which can improve measurement precision of a relative position of a wire electrode and a workpiece, by improving the contact detection precision between the wire electrode and the workpiece.

DETAILED DESCRIPTION OF THE INVENTION

Hereinafter, a control device 1 and program according to an embodiment of the present disclosure will be explained by referencing FIGS. 1 and 2. First, before explaining the control device 1 and program of the embodiment, a wire electrical discharge machine 100 controlled by the control device 1 will be explained.

Figure 1:
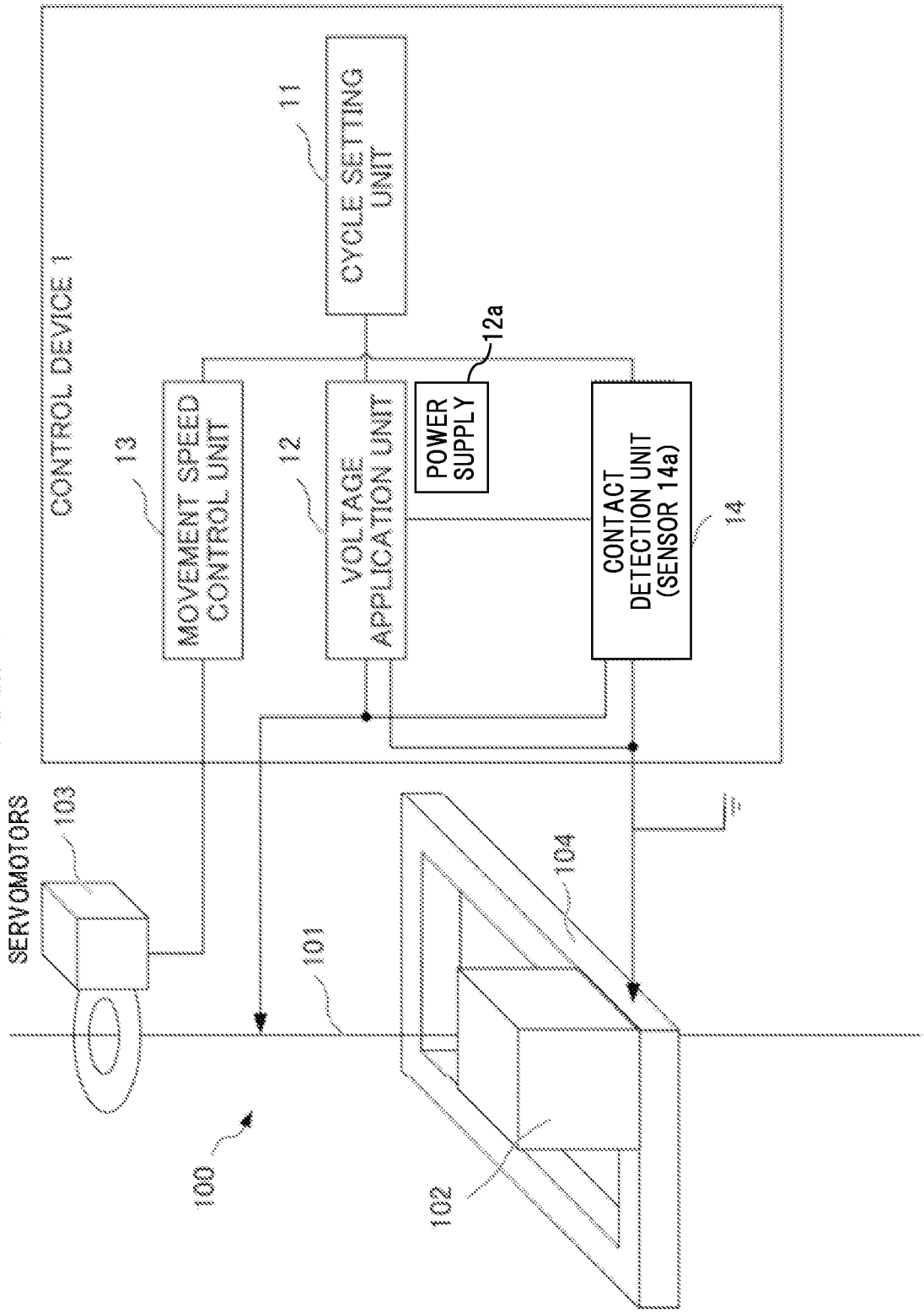
FIG. 1 is a block diagram showing a control device according to an embodiment of the present disclosure.
Figure 2:
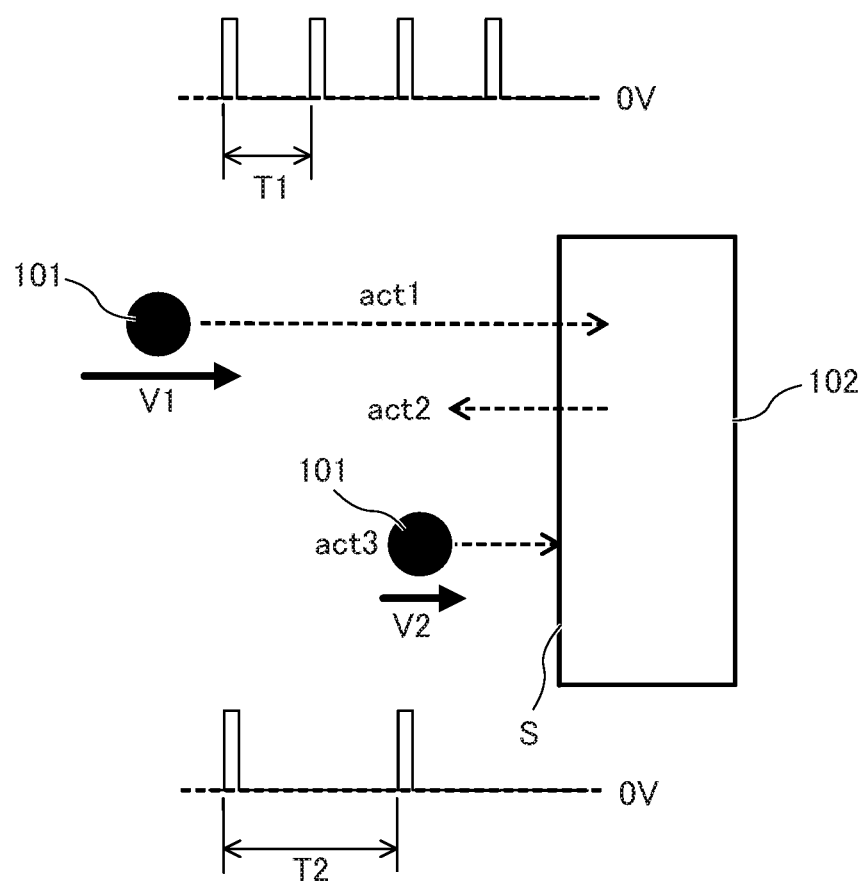
FIG. 2 is a schematic diagram showing an outline of detecting contact by way of the control device of the embodiment.

The wire electrical discharge machine 100, for example, is a device which machines a workpiece 102 by applying a working voltage at the electrode gap between a wire electrode 101 and workpiece 102, as shown in FIG. 1. The wire electrical discharge machine 100 has a movement drive unit 103 which causes the wire electrode 101 and workpiece 102 to relatively move. The movement drive unit 103 is configured by a plurality of servomotors (not shown) arranged on the respective axes of the wire electrode 101 and workpiece 102, for example. The movement drive unit 103 machines the workpiece 102 to a predetermined shape by causing the wire electrode 101 and workpiece 102 to relatively move. The movement drive unit 103, for example, relatively moves the wire electrode 101 and workpiece 102, by causing an electrically-conductive table 104 on which the workpiece 102 is placed, and the wire electrode 101 to move. It should be noted that, in order to simplify explanation in the following embodiment, an example in which the movement drive unit 103 moves the wire electrode 101 relative to the workpiece 102 will be explained.

Next, measurement of the relative position between the wire electrode 101 and workpiece 102 in the wire electrical discharge machine 100 will be explained. In the wire electrical discharge machine 100, upon starting machining of the workpiece 102, measurement of the relative position between the wire electrode 101 and workpiece 102 is conducted. In the measurement of the relative position, first, a pulse-like detection voltage of a level lower than the working voltage is applied at the electrode gap between the wire electrode 101 and workpiece 102. Then, the wire electrode 101 and workpiece 102 are relatively moved in an approaching direction. A change in the detection voltage is detected by the wire electrode 101 and workpiece 102 making contact. It is thereby possible to measure the positions of the wire electrode 101 and workpiece 102. Then, the wire electrical discharge machine 100 can machine the workpiece 102 to a predetermined shape, with the measured position as a reference position.

Next, the control device 1 and program according to the first embodiment of the present disclosure will be explained by referencing FIGS. 1 and 2. The control device 1 is a device which controls the wire electrical discharge machine 100. The control device 1 measures the relative position between the wire electrode 101 and workpiece 102, by detecting contact between the wire electrode 101 and workpiece 102 which were made to relatively move. In the present embodiment, the control device 1 detects twice in the order of a first detection operation and a second detection operation the contact between the wire electrode 101 and workpiece 102. The control device 1 includes a cycle setting unit 11, a voltage application unit 12, a movement speed control unit 13, and a contact detection unit 14, as shown in FIG. 1.

The cycle setting unit 11, for example, is realized by a CPU operating. The cycle setting unit 11 sets a pulse cycle of the detection voltage applied at the electrode gap between the wire electrode 101 and workpiece 102. The cycle setting unit 11 can change the pulse cycle of the detection voltage, based on the pulse frequency inputted from the outside, for example. In the present embodiment, the cycle setting unit 11, as shown in FIG. 2, sets different pulse cycles, at the first detection operation (act1) and the second detection operation (act3). More specifically, the cycle setting unit 11 sets the second pulse cycle T2 in the second detection operation to be longer than the first pulse cycle T1 set in the first detection operation. The cycle setting unit 11 sets the second pulse cycle T2 set in the second detection operation to 1.5 times or more than the first pulse cycle T1 set in the first detection operation, for example.

The voltage application unit 12, for example, is realized by a CPU controlling a power source 12a that applies the detection voltage. The voltage application unit 12 applies the detection voltage to the electrode gap at the set cycle. The voltage application unit 12, for example, applies the detection voltage of the pulse cycle set by the cycle setting unit 11 at the electrode gap. The voltage application unit 12, for example, applies the detection voltage of the first pulse cycle T1 in the first detection application to the electrode gap between the wire electrode 101 and workpiece 102, as shown in FIG. 2. In addition, the voltage application unit 12 applies the detection voltage of the second pulse cycle T2 in the second detection operation to the electrode gap between the wire electrode 101 and workpiece 102.

The movement speed control unit 13, for example, is realized by a CPU operating. The movement speed control unit 13 controls the relative movement speed by the movement drive unit 103. The movement speed control unit 13, for example, controls the relative movement speed between the wire electrode 101 and workpiece 102 (table 104). In addition, the movement speed control unit 13 can change the relative movement speed based on the relative movement speed inputted from outside, for example. In the present embodiment, the movement speed control unit 13 controls different relative movement speeds in the first detection operation and the second detection operation. More specifically, the movement speed control unit 13 controls the second relative movement speed V2 in the second detection operation to be slower than the first relative movement speed V1 in the first detection operation. In addition, the movement speed control unit 13, after execution of the first detection operation, causes the wire electrode 101 and workpiece 102 to relatively move (act2 in FIG. 2), before execution of the second detection operation.

The contact detection unit 14, for example, is realized by a CPU controlling a sensor 14a. The contact detection unit 14 detects contact between the wire electrode 101 and workpiece 102, based on a change in the applied detection voltage. The contact detection unit 14, for example, detects the contact between the wire electrode 101 and workpiece 102, by detecting the disappearance of the peak voltage. In addition, the contact detection unit 14 measures the positions of the wire electrode 101 and the position of the workpiece 102, by detecting the contact. In the present embodiment, the contact detection unit 14, after executing the first detection operation of contact between the wire electrode 101 and workpiece 102 at the first relative movement speed V1 and first pulse cycle T1, executes the second detection operation of contact between the wire electrode 101 and workpiece 102, at the second relative movement speed V2 which is slower than the first relative movement speed V1, and at the second pulse cycle T2 which is longer than the first pulse cycle T1.

Next, operation of the control device 1 according to the present embodiment will be explained using FIG. 2. First, the cycle setting unit 11 sets the first pulse cycle T1 upon executing the first detection operation. Next, the movement speed control unit 13 sets the first relative movement speed V1.

Then, the voltage application unit 12 applies the detection voltage set in the first pulse cycle T1 to the electrode gap between the wire electrode 101 and workpiece 102. Next, the movement speed control unit 13 causes the wire electrode 101 to move (relatively move) in the approaching direction at the first relative movement speed V1, in relation to an end surface S of the workpiece 102.

Then, the contact detection unit 14 detects contact between the wire electrode 101 and the workpiece 102. The contact detection unit 14 measures the relative position between the wire electrode 101 and workpiece 102. The first detection operation thereby ends. Next, the movement speed control unit 13 moves (relatively moves) the wire electrode 101 in a direction distancing from the workpiece 102. The movement speed control unit 13 distances the wire electrode 101 from the workpiece 102 at a shorter distance than a relative movement distance of the wire electrode 101 and workpiece 102 in the first detection operation, for example.

Next, the cycle setting unit 11 sets the second pulse cycle T2, upon executing the second detection operation. Then, the movement speed control unit 13 sets the second relative movement speed V2.

Next, the voltage application unit 12 applies the detection voltage set in the second pulse cycle T2 to the electrode gap between the wire electrode 101 and workpiece 102. Then, the movement speed control unit 13 causes the wire electrode 101 to move (relatively move) in the approaching direction at the second relative movement speed V2, to one end surface S of the workpiece 102.

Next, the contact detection unit 14 detects contact between the wire electrode 101 and workpiece 102. The contact detection unit 14 measures the relative position of the wire electrode 101 and workpiece 102. The second detection operation thereby ends.

Next, a program of the present embodiment will be explained. Each configuration included in the control device 1 can be respectively realized by hardware, software or a combination of these. Herein, being realized by software indicates the matter of being realized by a computer reading and executing a program.

The program can be stored using various types of non-transitory computer readable media, and supplies to the computer. Non-transitory computer readable medium includes various types of tangible storage media. Examples of non-transitory computer readable media include magnetic recording media (e.g., flexible disk, magnetic tape, hard disk drive), magneto-optical recording media (e.g., magneto-optical disk), CD-ROM (Read Only Memory), CD-R, CD-R/W and semiconductor memory (e.g., mask ROM, PROM (programmable ROM), EPROM (Erasable PROM), flash ROM, RAM (random access memory)). In addition, the display program may be supplied to the computer by way of various types of transitory computer readable media. Examples of transitory computer readable media include electrical signals, optical signals and electromagnetic waves. Transitory computer readable media can supply programs to the computer via wired communication paths such as electric wires and optical fiber, or wireless communication paths.

According to the control device 1 and program of the first embodiment above, the following effects are exerted. (1) In the control device 1 which controls the wire electrical discharge machine 100 having a movement drive unit 103 that causes the wire electrode 101 and workpiece 102 to relatively move, the control device 1 measuring the relative position of the wire electrode 101 and workpiece 102 by detecting contact between the wire electrode 101 and workpiece 102 which have been relatively moved includes: the cycle setting unit 11 which sets the pulse cycle of the detection voltage applied to the electrode gap between the wire electrode 101 and workpiece 102; the voltage application unit 12 which applies the detection voltage to the electrode gap at the set cycle; the movement speed control unit 13 which controls the relative movement speed by the movement drive unit 103; and the contact detection unit 14 which detects contact between the wire electrode 101 and workpiece 102, based on the change in the applied detection voltage; in which the contact detection unit 14 executes the second detection operation of contact between the wire electrode 101 and workpiece 102 at the second relative movement speed V2 which is slower than the first relative movement speed V1, and at the second pulse cycle T2 which is longer than the first pulse cycle T1, after executing the first detection operation of contact between the wire electrode 101 and workpiece 102 at the first relative movement speed V1 and first pulse cycle T1, and the movement speed control unit 13 causes the wire electrode 101 and workpiece 102 to relatively move in a distancing direction after execution of the first detection operation and before execution of the second detection operation.

In addition, in a program which causes a computer to function as the control device 1 which controls the wire electrical discharge machine 100 having a movement drive unit 103 that causes the wire electrode 101 and workpiece 102 to relative move, the control device 1 measuring the relative position of the wire electrode 101 and workpiece 102 by detecting contact between the wire electrode 101 and workpiece 102 which have been relatively moved, the program causes the computer to function as: the cycle setting unit 11 which sets the pulse cycle of the detection voltage applied to the electrode gap between the wire electrode 101 and workpiece 102; the voltage application unit 12 which applies the detection voltage to the electrode gap at the set cycle; the movement speed control unit 13 which controls the relative movement speed by the movement drive unit 103; and the contact detection unit 14 which detects contact between the wire electrode 101 and workpiece 102, based on the change in the applied detection voltage; in which the contact detection unit 14 executes the second detection operation of contact between the wire electrode 101 and workpiece 102 at the second relative movement speed V2 which is slower than the first relative movement speed V1, and at the second pulse cycle T2 which is longer than the first pulse cycle T1, after executing the first detection operation of contact between the wire electrode 101 and workpiece 102 at the first relative movement speed V1 and first pulse cycle T1, and the movement speed control unit 13 causes the wire electrode 101 and workpiece 102 to relatively move in a distancing direction after execution of the first detection operation and before execution of the second detection operation.

It is thereby possible to preliminarily measure the relative position of the wire electrode 101 and one end surface S of the workpiece 102, at the first pulse cycle T1 and first relative movement speed V1 in the first detection operation. Then, in the second detection operation, it is possible to suppress the occurrence of craters in the workpiece 102, by measuring the relative position of the wire electrode 101 and one end surface S of the workpiece 102 at the second pulse cycle T2 and second relative movement speed V2. In addition, it is possible to suppress the influence of deflection of the wire electrode 101, by using the detection voltage of the second pulse cycle T2. Therefore, by improving the contact detection precision between the wire electrode 101 and workpiece 102, it is possible to improve the measurement precision of the relative position of the wire electrode 101 and workpiece 102.

Although each preferred embodiment of the control device and program of the present disclosure have been explained above, the present disclosure is not to be limited to the aforementioned embodiments, and modifications thereof are possible where appropriate. For example, in the above embodiments, an example using the first and second detection operations is explained; however, it is not limited thereto. For example, measurement may be executed using three or more detection operations. In this case, detection operations executed later are executed with a longer pulse cycle and slower relative movement speed.

In addition, in the above embodiments, an example moving the wire electrode 101 relative to the workpiece 102 is explained; however, it is not limited thereto. Both the workpiece 102 and wire electrode 101 may be configured to move relatively. It may be a mode in which the workpiece 102 moves and the wire electrode 101 does not move.

In addition, in the first detection operation, the first pulse cycle T1 and/or first relative movement speed V1 may not be constant. In the second detection operation, the second pulse cycle T2 and/or second relative movement speed V2 may not be constant.

In addition, in the above embodiments, the contact detection unit 14 is configured to execute the first detection operation and the second detection operation; however, it is not limited thereto. As another embodiment, the contact detection unit 14 executes the detection operation two or more times, and in any of the detection operations of the second time and later, contact between the wire electrode 101 and the workpiece is detected more slowly than the relative movement speed of the wire electrode 101 and workpiece 102, and at a pulse cycle longer than the pulse cycle in the detection operations prior to these. By configuring in this way, it is possible to improve the measurement precision of the relative position of the wire electrode 101 and workpiece 102.

In addition, as another embodiment, the contact detection unit 14 may execute the detection operation a plurality of times by slowing the relative movement of the wire electrode 101 and workpiece 102, and lengthening the pulse cycle, in every detection operation. It is thereby possible to further improve the position detection precision of one end surface S of the workpiece 102. In addition, the movement speed control unit 13 causes the wire electrode 101 and workpiece 102 to relatively move in the distancing direction every time during the detection operation. At this time, it may be configured so that the movement speed control unit 13 shortens the distance by which distancing the wire electrode 101 and workpiece 102 every time the number of the detection operation advances. It is thereby possible to suppress an increase in the time required for the overall detection operation, even if the relative movement speed bringing the wire electrode 101 and workpiece 102 into contact becomes slower every time the number of the detection operation advances.

EXPLANATION OF REFERENCE NUMERALS 1 control device
11 cycle setting unit
12 voltage application unit
13 movement speed control unit
14 contact detection unit
100 wire electrical discharge machine
101 wire electrode
102 workpiece
103 movement drive unit
T1 first pulse cycle
T2 second pulse cycle
V1 first relative movement speed
V2 second relative movement speed

What is claimed is:

1. A control device which controls a wire electrical discharge machine having a servomotor causing a wire electrode and a workpiece to relatively move, the control device measuring a relative position of the wire electrode and the workpiece by detecting contact between the wire electrode and the workpiece which had been made to relatively move, the control device comprising a CPU, the CPU being configured to:
   set a pulse cycle of a detection voltage applied to an electrode gap between the wire electrode and the workpiece;
   control a power supply connected to the control device to apply the detection voltage to the electrode gap at the set cycle;
   control relative movement speed by way of the servomotor; and
   detect contact between the wire electrode and the workpiece, based on a change in the applied detection voltage detected by a sensor,
   wherein the CPU, after executing a first detection operation of contact between the wire electrode and the workpiece at a first relative movement speed and a first pulse cycle of the detection voltage applied by the power supply, executes a second detection operation of contact between the wire electrode and the workpiece, at a second relative movement speed which is slower than the first relative movement speed, and at a second pulse cycle of the detection voltage applied by the power supply which is longer than the first pulse cycle, and
   wherein the CPU, after execution of the first detection operation, and prior to execution of the second detection operation, causes the wire electrode and the workpiece to relatively move in a distancing direction.

2. The control device according to claim 1, wherein the CPU executes detection operations two or more times, and in any of the detection operations among a second and later times, detects contact between the wire electrode and the workpiece at a relative movement speed of the wire electrode and the workpiece slower than relative movement speeds of prior detection operations and at a pulse cycle longer than pulse cycles of the prior detection operations.

3. The control device according to claim 1, wherein the CPU sets a pulse cycle set in the second detection operation to 1.5 times or more relative to a pulse cycle set in the first detection operation.

4. A non-transitory computer readable media encoded with a program which causes a computer to function as the control device according to claim 1.

5. The control device according to claim 1, wherein the CPU executes detection operations three or more times, and in any of the detection operations among a second and later times, detects contact between the wire electrode and the workpiece at a relative movement speed of the wire electrode and the workpiece slower than relative movement speeds of prior detection operations and at a pulse cycle longer than pulse cycles of the prior detection operations, and wherein the CPU shortens a distance to relatively move in the distancing direction every time a number of detection operations advances.

\* \* \* \* \*